H. B. WILSON.
GARDEN HOE.
APPLICATION FILED JAN. 11, 1919.

1,331,734.

Patented Feb. 24, 1920.

INVENTOR.
HARRY B. WILSON.

UNITED STATES PATENT OFFICE.

HARRY BEMROSE WILSON, OF CALGARY, ALBERTA, CANADA.

GARDEN-HOE.

1,331,734.  Specification of Letters Patent.  Patented Feb. 24, 1920.

Application filed January 11, 1919. Serial No. 270,701.

*To all whom it may concern:*

Be it known that I, HARRY BEMROSE WILSON, a subject of the King of Great Britain, of the city of Calgary, in the Province of Alberta, Canada, have invented certain new and useful Improvements in Garden-Hoes, of which the following is a specification.

My invention relates to improvements in garden hoes and the object of the invention is to devise a hoe by which the user can cultivate very close to young plants without the risk of damaging the same and which at the same time effectually kills the weeds so that there is no chance of their again taking root and leaves them as a top dressing upon the surface of the soil and by which the operation of hoeing can be done more quickly than can be done by the hoe which is commonly in use and it consists essentially of the following arrangement and construction of parts as hereinafter more particularly explained.

In the drawings like characters of reference indicate corresponding parts in the various figures.

Figures 1, 2:
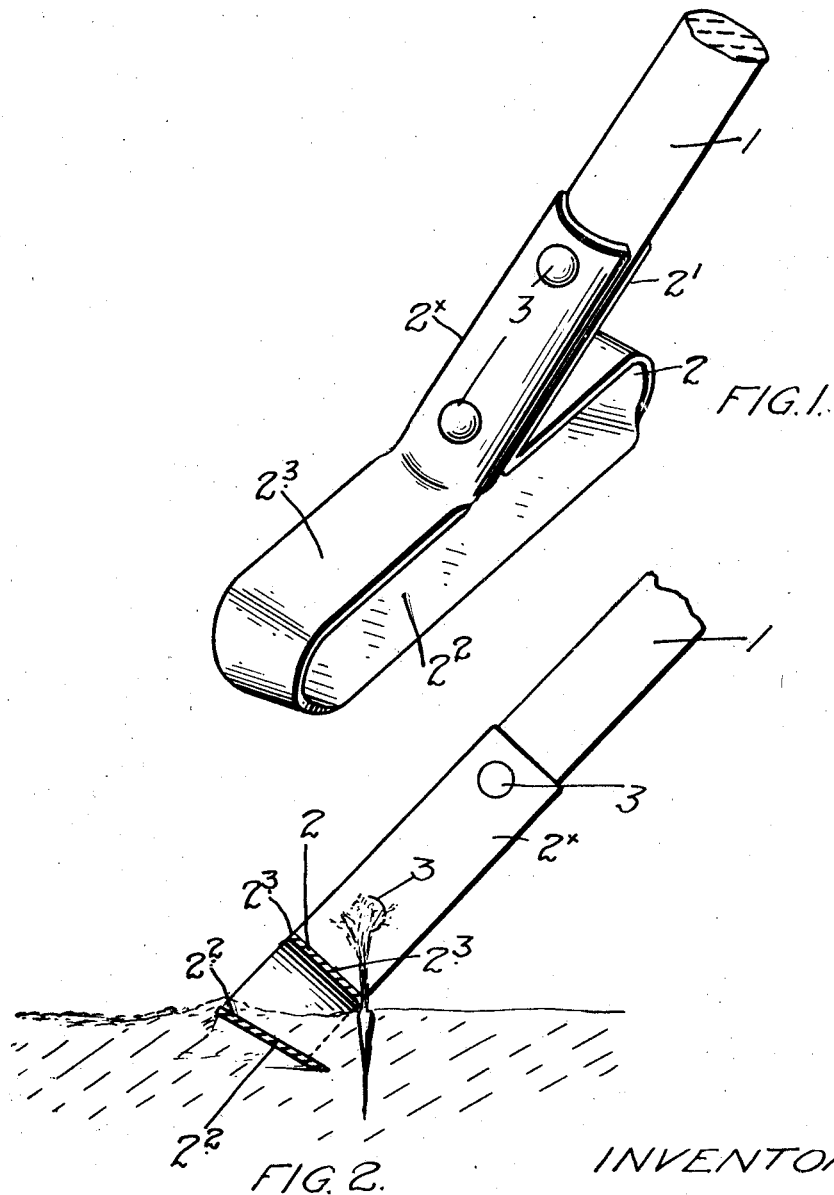
Figure 1, is a perspective view of my device.
Fig. 2, is a sectional view showing its application.

1 indicates the shank of a hoe which forms the handle. 2 indicates a loop member which extends at right angles to the end of the hoe in T-form, the ends of the loop being turned up at $2^x$ and $2'$ and secured against each side of the handle 1 by cross bolts 3. The loop 2 is an elongated loop, the lower portion $2^2$ of which is set at a slight angle to the upper portion $2^3$ so that the forward edge of the portion $2^2$ is nearer the forward edge of the portion $2^3$ than the rearward edge of the portion $2^2$ to the rearward edge of the portion $2^3$. The forward edge of the portion $2^2$ also extends slightly forward beyond the face of the loop, such edge being sharpened to form a cutting portion of the instrument.

When the device is drawn through the ground it holds up the surface which passes through the loop, lifting the cut weeds clear of the ground so that they will be severed below the crown and lie upon the surface of the ground. The hoe being held in an inclined direction as indicated in Fig. 2 will allow of the upper portion of the loop contacting with the young plants so as to form a gage preventing the cutting edge of the hoe coming in contact with such plants and killing them.

It will, therefore, be seen by this construction that it will be possible to cultivate very much closer to the plants without any risk of damaging the same than could be done by an ordinary hoe. Also by being drawn through the ground continuously instead of being used with a chopping action insures of the weeds being cut and, therefore, destroyed, the work being done very much more quickly.

What I claim as my invention is.

1. A garden hoe comprising a cutting member formed by a flat loop adapted to extend at right angles to the end of the handle in T-form and having the lower portion of the loop inclined inwardly toward its forward edge in relation to the upper portion of the loop and having such forward edge extending beyond the face of the loop and sharpened to form a cutting edge.

2. In a garden hoe, the combinaion with the handle, of a cutting member extending at right angles to the handle in T-form, and a portion extending parallel thereto above the same adapted to form a guard between the plants and the cutting edge of the member.

HARRY BEMROSE WILSON.

Witnesses:
W. A. MACKINNON,
THOS. H. RANDALL.